(12) United States Patent
Kupratis et al.

(10) Patent No.: US 10,801,443 B2
(45) Date of Patent: Oct. 13, 2020

(54) FAN DRIVE GEAR SYSTEM ELECTRICAL CONDITIONING CIRCUIT FOR HYBRID ELECTRIC GAS TURBINE ENGINE

(71) Applicant: United Technologies Corporation, Farmington, CT (US)

(72) Inventors: Daniel B. Kupratis, East Hartford, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 161 days.

(21) Appl. No.: 16/152,488

(22) Filed: Oct. 5, 2018

(65) Prior Publication Data
US 2020/0109685 A1    Apr. 9, 2020

(51) Int. Cl.
*F02K 5/00* (2006.01)
*F01D 13/00* (2006.01)
(Continued)

(52) U.S. Cl.
CPC ............... *F02K 5/00* (2013.01); *F01D 13/00* (2013.01); *F01D 15/10* (2013.01); *F01D 21/00* (2013.01); *F02C 7/36* (2013.01); *F02K 3/06* (2013.01); *F05D 2220/76* (2013.01); *F05D 2260/40311* (2013.01)

(58) Field of Classification Search
CPC .......... F01D 13/00; F01D 15/00; F01D 15/10; F05D 2220/76; F05D 2260/40311; F02C 3/113; F02C 7/36; B64D 2027/026; F02K 3/06; F02K 5/00
See application file for complete search history.

(56) References Cited

U.S. PATENT DOCUMENTS 8,561,383 B2    10/2013  Suciu et al.
2004/0255590 A1  12/2004  Rago
(Continued)

OTHER PUBLICATIONS

EP search report for EP19201732.5 dated Feb. 26, 2020.

*Primary Examiner* — Scott J Walthour
*Assistant Examiner* — William L Breazeal
(74) *Attorney, Agent, or Firm* — Getz Balich LLC (57) ABSTRACT

A hybrid gas turbine engine comprises a turbine, a compressor, and a gear system that is driven by the turbine where the gear system includes a sun gear, a ring gear and a plurality of planet gears, where the ring gear has a ring gear radius of $R_{Ring\ gear}$ and the sun gear has a sun gear radius of $R_{Sun\ gear}$ such that the gear system provides a reduction ratio of $R_{Ring\ gear}/R_{Sun\ gear}$. A fan is driven by the ring gear, and a generator is driven by the ring gear and provides a generator output signal. A power circuit receives the generator output signal and provides a gain $R_{Ring\ gear}/R_{Sun\ gear}$ to the generator output signal and provides a gain signal indicative thereof to an electrical load.

15 Claims, 5 Drawing Sheets

(51) Int. Cl.
   *F01D 15/10*   (2006.01)
   *F01D 21/00*   (2006.01)
   *F02C 7/36*   (2006.01)
   *F02K 3/06*   (2006.01)

(56) References Cited

U.S. PATENT DOCUMENTS

2008/0184906 A1*  8/2008  Kejha ................... B64D 27/02
                                                    102/374
2016/0229549 A1   8/2016  Mitrovic
2017/0225794 A1*  8/2017  Waltner ................ B64D 27/02
2019/0375512 A1* 12/2019  Ribeiro .................... F02C 6/20

* cited by examiner

FAN DRIVE GEAR SYSTEM ELECTRICAL CONDITIONING CIRCUIT FOR HYBRID ELECTRIC GAS TURBINE ENGINE

BACKGROUND OF THE INVENTION

1. Technical Field

The present disclosure relates generally to gas turbine engines, more particularly to an electrical conditioning circuit for use with a gas turbine engine that includes a fan drive gear system.

2. Background Information

In a conventional turbofan, a single shaft (the "low-pressure" or LP shaft) connects the fan, the low-pressure compressor and the low-pressure turbine (a second concentric shaft connects the high-pressure compressor and high-pressure turbine). In this configuration, the maximum tip speed for the larger radius fan limits the rotational speed for the LP shaft and thus the LP compressor and turbine. At high bypass ratios (and thus high radius ratios) the tip speeds of the LP turbine and LP compressor must be relatively low, which requires extra compressor and turbine stages to keep the average stage loadings and, therefore, overall component efficiencies to an acceptable level.

In a geared turbofan, a planetary reduction gearbox between the fan and the LP shaft allows the latter to run at a higher rotational speed thus enabling fewer stages to be used in both the LP turbine and the LP compressor, increasing efficiency and reducing weight. The lower fan speed allows higher bypass ratios, leading to reduced fuel consumption and reduced noise. A factor in the noise reduction is reduced fan tip speeds. In conventional turbofans the fan tips exceed the speed of sound resulting in a characteristic drone, requiring sound deadening. Geared turbofans operate the fan at lower rotational speeds to avoid supersonic tip speeds.

Given the different operating speeds of various shafts due to the geared turbofan structure, there is a need for an efficient system for handling various electrical systems associated with a hybrid electric gas turbine engine.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a hybrid gas turbine engine, comprising a turbine, a compressor, a gear system that is driven by the turbine where the gear system includes a sun gear, a ring gear and a plurality of planet gears, where the ring gear has a ring gear radius of $R_{Ring\ gear}$ and the sun gear has a sun gear radius of $R_{Sun\ gear}$ such that the gear system provides a reduction ratio of $R_{Ring\ gear}/R_{Sun\ gear}$. A fan is driven by the ring gear, and a generator is driven by the ring gear and provides a generator output signal. A power circuit receives the generator output signal and provides a gain $R_{Ring\ gear}/R_{Sun\ gear}$ to the generator output signal and provides a gain signal indicative thereof to an electrical load.

The electrical load may comprise a motor that drives the compressor.

The electrical load may comprise a battery located electrically parallel to the motor.

The power circuit may comprise at least one operational amplifier that receives the generator output signal and applies the gain $R_{Ring\ gear}/R_{Sun\ gear}$ to generate the gain signal.

Aspects of the disclosure are also directed to a hybrid gas turbine engine that comprises a turbine, a compressor and a gear system that is driven by the turbine where the gear system includes a sun gear, a plurality of planet gears configured to rotate and spaced apart by a carrier configured to rotate in a direction common to the sun gear, and a non-rotating ring gear, where the ring gear has a ring gear radius of $R_{Ring\ gear}$ and the sun gear has a sun gear radius of $R_{Sun\ gear}$ such that the gear system provides a reduction ratio of $(1+R_{Ring\ gear}/R_{Sun\ gear})$. The engine also includes a fan driven by the planet carrier, a generator that is driven by the planet carrier and provides a generator output signal, a power circuit that receives the generator output signal and provides a gain $(1+R_{Ring\ gear}/R_{Sun\ gear})$ to the generator output signal and provides a gain signal indicative thereof to an electrical load.

The electrical load may comprise a motor that drives the compressor.

The electrical load may comprise a battery located electrically parallel to the motor.

The power circuit may comprise at least one operational amplifier that receives the generator output signal and applies the gain $(1+R_{Ring\ gear}/R_{Sun\ gear})$ to generate the gain signal.

Aspects of the disclosure are further directed to a hybrid gas turbine engine, comprising a turbine, a compressor, a gear system that is driven by the turbine where the gear system includes a non-rotating sun gear, a ring gear, and plurality of planet gears configured to rotate and spaced apart by a carrier configured to rotate in a direction common to the ring gear, where the ring gear has a ring gear radius of $R_{Ring\ gear}$ and the sun gear has a sun gear radius of $R_{Sun\ gear}$ such that the gear system provides a reduction ratio of $(1+R_{Sun\ gear}/R_{Ring\ gear})$. The engine also includes a fan driven by the planet carrier, a generator that is driven by the planet carrier and provides a generator output signal, a power circuit that receives the generator output signal and provides a gain $(1+R_{Sun\ gear}/R_{Ring\ gear})$ to the generator output signal and provides a gain signal indicative thereof to an electrical load.

The electrical load may comprise a motor that drives the compressor.

The electrical load may comprise a battery located electrically parallel to the motor.

The power circuit may comprise at least one operational amplifier that receives the generator output signal and applies the gain (1+RSun gear/RRing gear) to generate the gain signal.

DETAILED DESCRIPTION

It is noted that various connections and steps are set forth between elements in the following description and in the drawings (the contents of which are incorporated in this specification by way of reference). It is noted that these connections and steps are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with an aircraft gas turbine engine.

Figure 1:
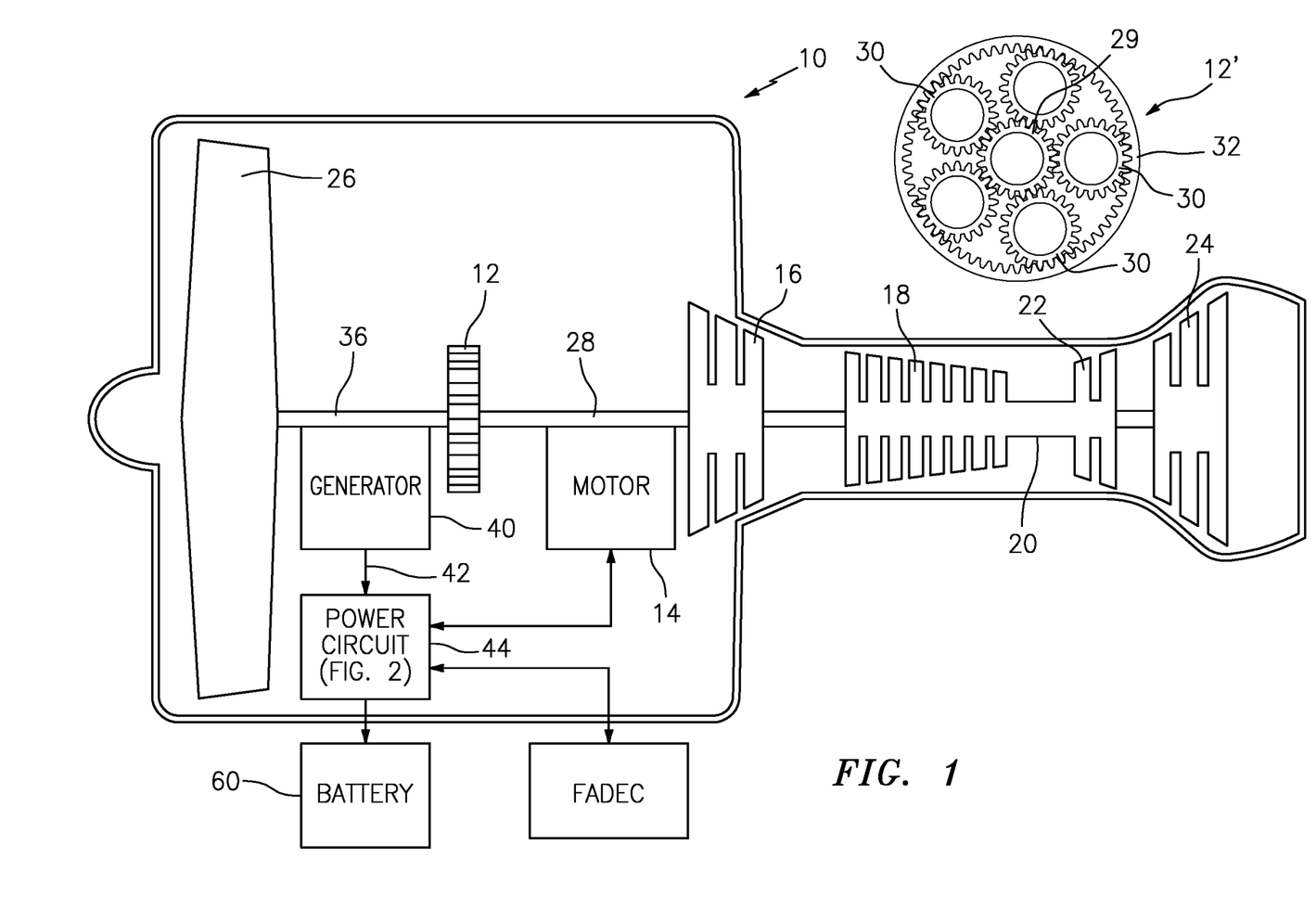
FIG. 1 is a simplified pictorial illustration of a hybrid electrical gas turbine engine with a fan drive gear system with an electrical conditioning circuit.

FIG. 1 is a simplified pictorial illustration of a hybrid electrical gas turbine engine 10 with a fan drive gear system 12 for use with a gear system (e.g., the gear 12' illustrated in FIG. 1). Notably, the engine 10 includes a motor 14 that may be selectively used to drive a low pressure compressor 16. The engine also includes a high pressure compressor 18, a combustor 20, a high pressure turbine 22 and low pressure turbine 24. The fan drive gear system 12 may include a planetary reduction gearbox located between a fan 26 and a low pressure (LP) shaft 28. The gearbox 12 allows the LP shaft 28 to run at a higher rotational speed in comparison to the fan 26. The lower fan speed allows higher bypass ratios, leading to reduced fuel consumption and reduced noise.

The fan drive gear system 12 may include an epicyclic gear train 12', which includes two gears so that the center of one gear revolves around the center of the other. The gear 12' may include a sun gear 29, a plurality of planet gears 30 and a ring gear 32. In one planetary gear embodiment, a carrier of the planet gears 30 is held stationary. The LP shaft 28 is connected to the sun gear 29 and the shaft 36 is connected to the ring gear 32. The plurality of planet gears 30 each roll on the inside of the ring gear 32.

In one embodiment, the gear train 12' may be configured to provide a reduction of X (e.g., 3:1) in the speed of shaft 36 connecting the gear train 12' and the fan 26, versus the speed of the LP shaft 28 driven by the LP turbine 24. The gear 12' may be characterized by the reduction ratio of $R_{Ring\ gear}/R_{Sun\ gear}$, where R is the respective radius of the associated gear. For example, the ring gear has radius $R_{Ring\ gear}$ and the sun gear has sun gear radius of $R_{Sun\ gear}$.

The reduction X may of course be selected by a designer to provide a reduction ratio other than 3:1 based upon the system design requirements of the engine 10.

In the hybrid engine 10, the motor 14 may be coupled (e.g., to the LP shaft 28) to selectively drive the LP compressor 16. A generator 40 may be driven by the shaft 36, and as a result provides a voltage signal on a line 42 related to the speed of the shaft 36/fan 26. The voltage signal on the line 42 is input to a power circuit 44 that conditions the signal on the line 42 based upon the reduction ratio $R_{Ring\ gear}/R_{Sun\ gear}$ of the gear 12' and provides a gain conditioned signal. The system also includes a FADEC to control and monitor operation of the engine 10.

Figure 2:
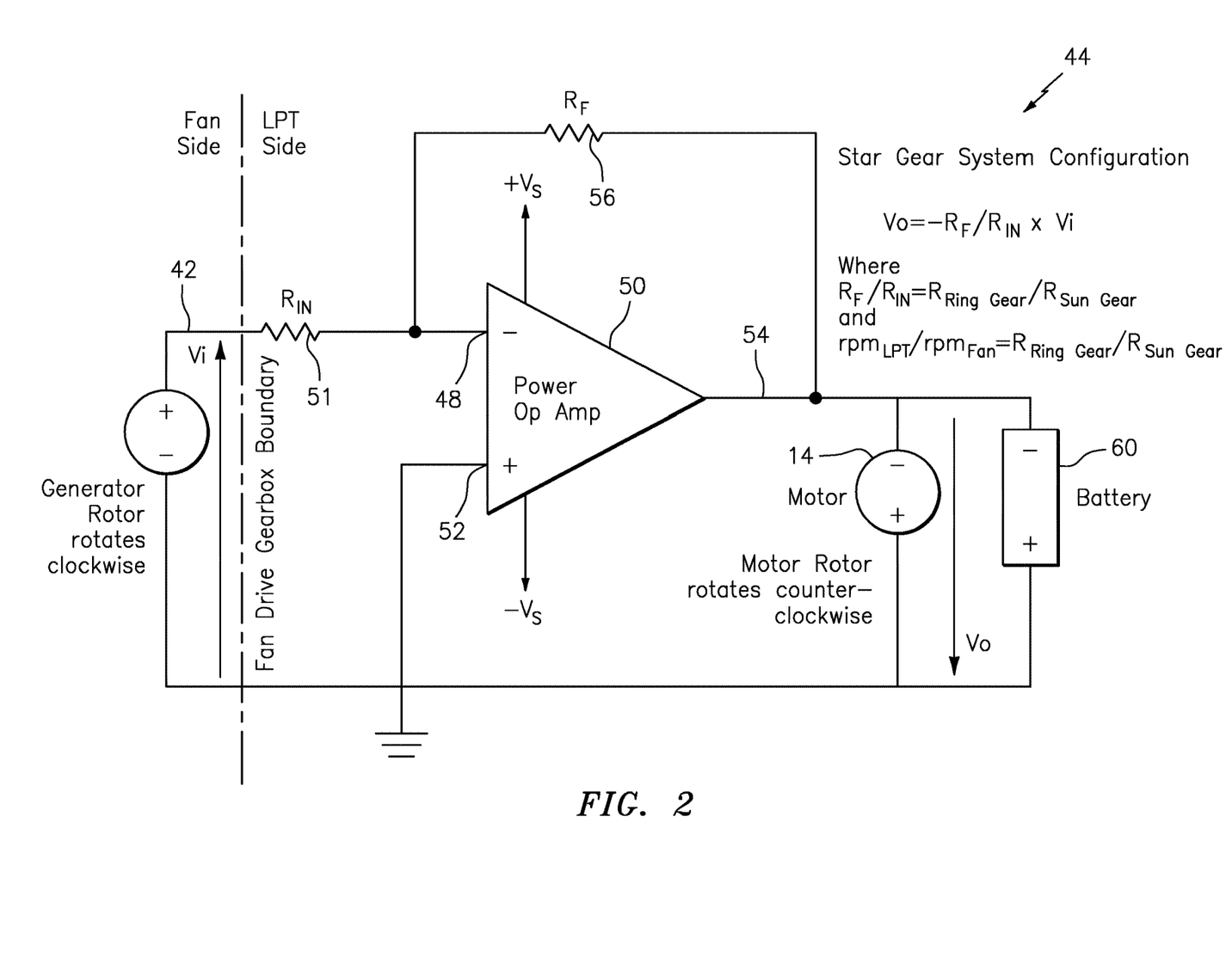
FIG. 2 is a block diagram illustration of an electrical conditioning circuit for the hybrid electrical gas turbine engine of FIG. 1.

For the hybrid electrical gas turbine illustrated in FIG. 1 a carrier of the planet gears 30 is held stationary in the epicyclic gear train 12'. The LP shaft 28 is connected to the sun gear 29 and the shaft 36 is connected to the ring gear 32. FIG. 2 is a block diagram illustration of the circuit 44 illustrated in FIG. 1. The circuit 44 receives the voltage signal on the line 42 from the generator 40 (FIG. 1) and applies a gain to the signal. Since the generator 40 may rotate clockwise, the signal on the line 42 may be input to an inverting input 48 of operational amplifier 50 via a resistor $R_{in}$ 51. Non-inverting input 52 of the op-amp 50 may be tied to a reference voltage (e.g., ground). The inverting input 48 is coupled to output signal on line 54 via feedback resister $R_f$ 56. As a result of this configuration, the op amp 50 provides a gain of $-R_f/R_{in}$. The output signal on the line 54 may be provided to one or more of a battery 60 and the motor 14.

The magnitude of the gain $R_f/R_{in}$ may be selected to match the reduction ratio of $R_{Ring\ gear}/R_{Sun\ gear}$ associated with the gear 12' (FIG. 1). For example, if the reduction ratio $R_{Ring\ gear}/R_{Sun\ gear}$ is three, then the gain $R_f/R_{in}$ is selected to be three. The gain $R_f/R_{in}$ amplifies the voltage generated in response to the lower RPM on the shaft 36, and the resultant amplified signal may then be used to drive a load. For example, the load may be the motor 14, which may require a higher voltage than output from the generator in order drive the higher RPM motor.

Figure 3:
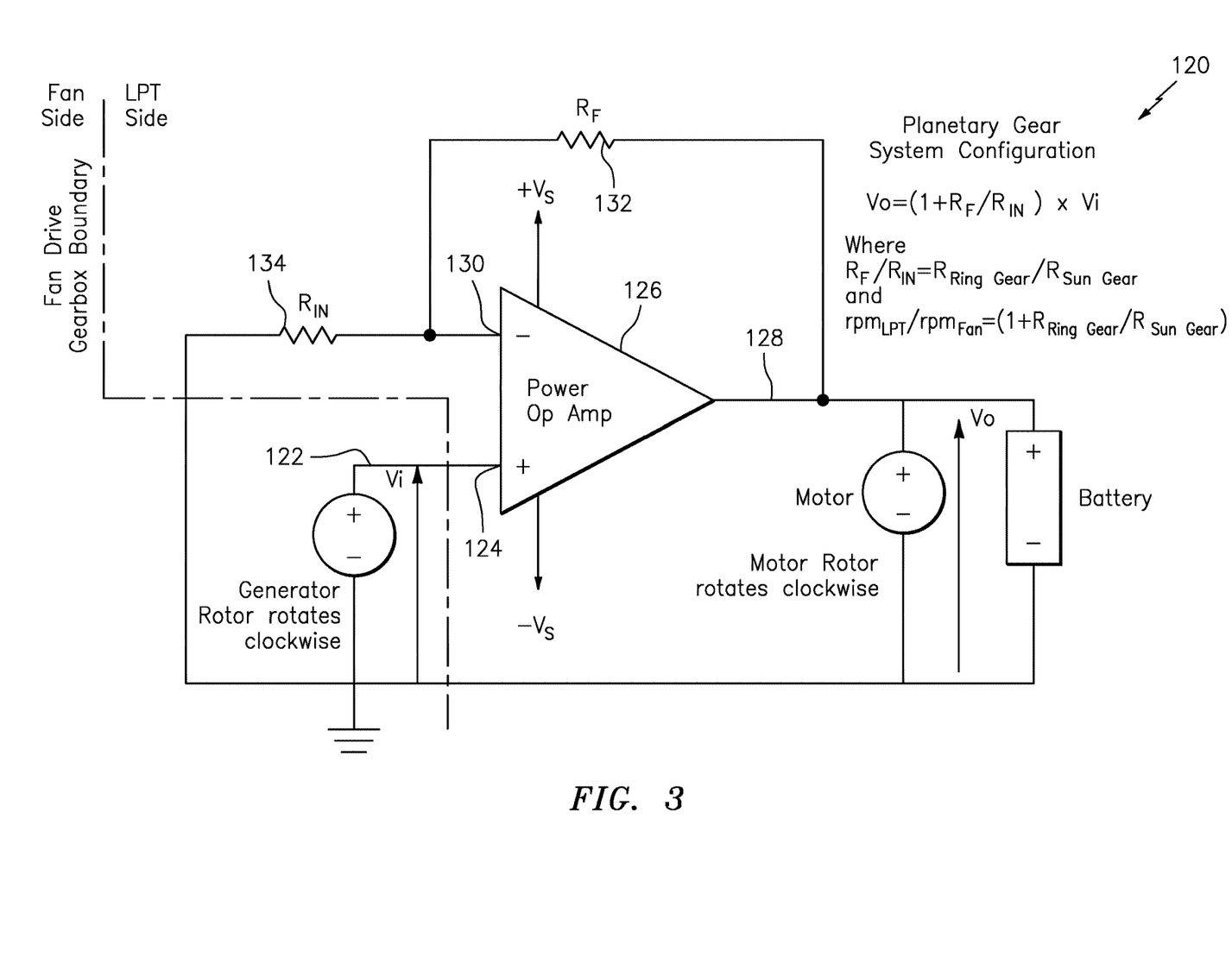
FIG. 3 is a block diagram illustration of an alternative embodiment electrical conditioning circuit for the hybrid electrical gas turbine engine of FIG. 1.

FIG. 3 is a block diagram illustration of an alternative embodiment electrical conditioning circuit 120 for the hybrid electrical gas turbine engine of FIG. 1 for use with a planetary gear system (i.e., the gear 12' illustrated in FIG. 1 is configured as a planetary gear system). In this embodiment, the ring gear 32 (FIG. 1) is held fixed (i.e., does not rotate), the input is applied to the sun gear 29, and the output is provided on the carrier of the planetary gears 30. In this planetary gear embodiment the reduction ratio is equal to $(1+R_{Ring\ gear}/R_{Sun\ gear})$. In this planetary gear embodiment the electrical circuit 120 receives input signal $V_i$ from generator 40, and the input signal $V_i$ is input on line 122 to non-inverting input 124 of operational amplifier 126 (i.e., the generator 40 and the motor 14 rotate in the same direction). In this embodiment the operational amplifier 126 provides output $V_o$ on line 128. The output signal on the line 128 is fedback to inverting input 130 via resistor $R_f$ 132, and the inverting input 130 is connected to a voltage datum (e.g., ground) through resistor $R_{in}$ 134. In this embodiment the ratio $R_f/R_{in}$ is selected to be equal to the reduction ratio minus 1.0, of the gear 12' (FIG. 1). As a result, the output signal $V_o=(1+R_f/R_{in})*V_i$. The ratio $R_f/R_{in}$ is equal to the ratio $R_{Ring\ gear}/R_{Sun\ gear}$.

Figure 4:
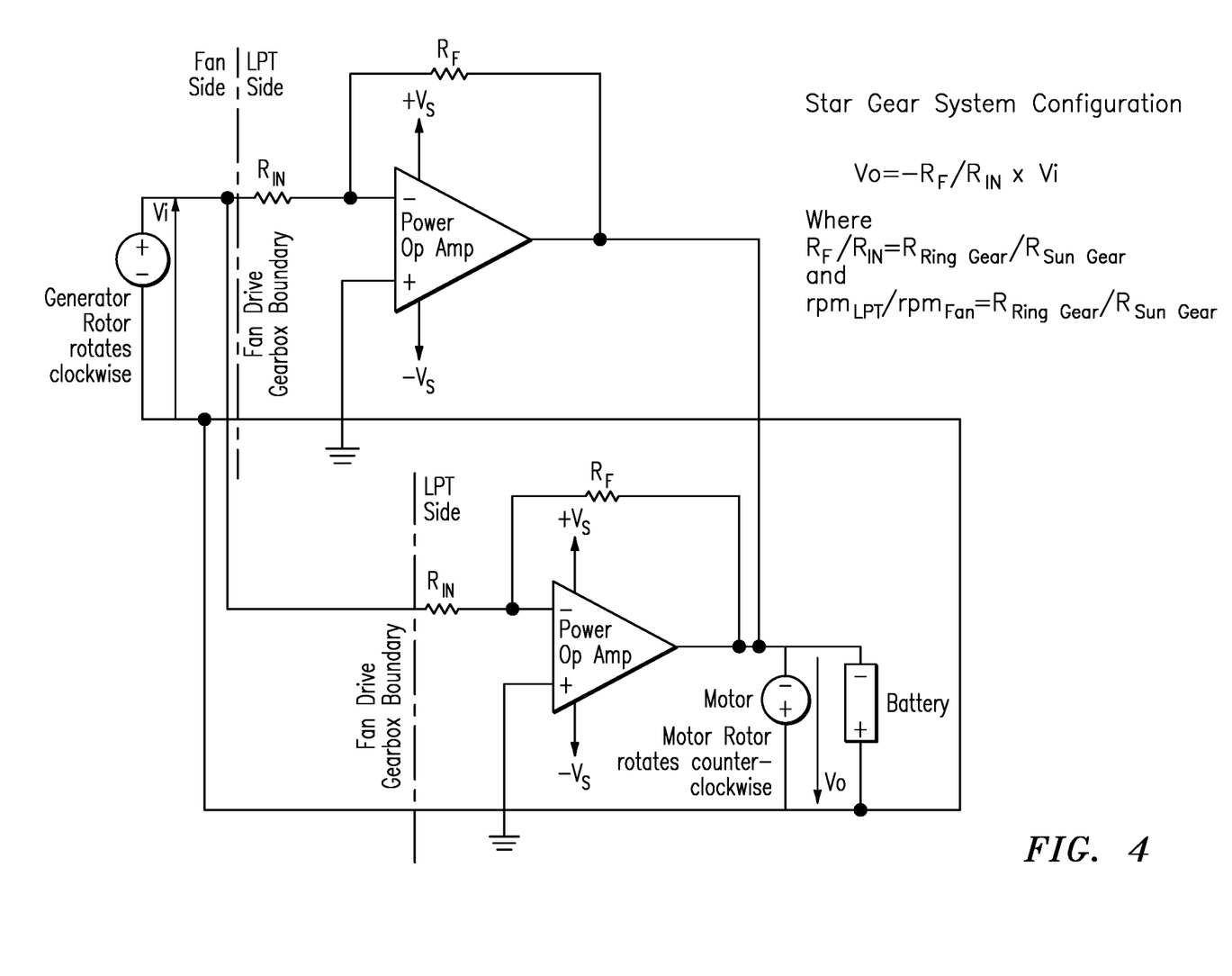
FIG. 4 is a block diagram illustration of another alternative electrical conditioning circuit for the hybrid electrical gas turbine engine of FIG. 1.

FIG. 4 is a block diagram illustration of another alternative electrical conditioning circuit for the hybrid electrical gas turbine engine of FIG. 1. This embodiment is substantially similar to the embodiment of FIG. 2 but uses a plurality of electrically parallel operational amplifiers.

Figure 5:
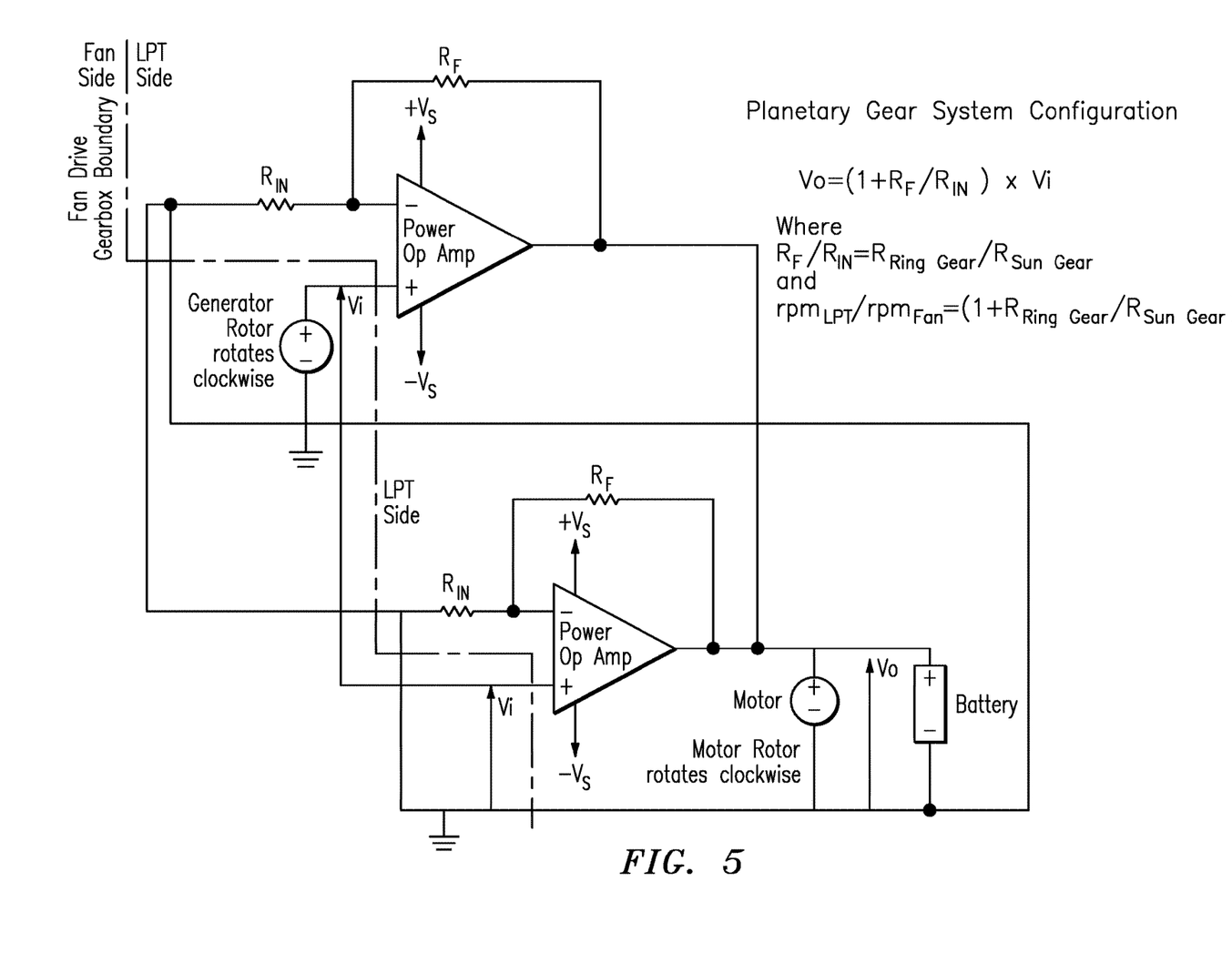
FIG. 5 is a block diagram illustration of yet another alternative electrical conditioning circuit for the hybrid electrical gas turbine engine of FIG. 1.

FIG. 5 is a block diagram illustration of yet another alternative electrical conditioning circuit for the hybrid electrical gas turbine engine of FIG. 1. This embodiment is substantially similar to the embodiment of FIG. 3 but uses a plurality of electrically parallel operational amplifiers.

In another embodiment, the sun gear 29 (FIG. 1) is held fixed (i.e., does not rotate), the input is applied to the ring gear 32, and the output is provided on the carrier of the planetary gears 30. In this epicyclic gear embodiment the reduction ratio is equal to $(1+R_{Sun\ gear}/R_{Ring\ gear})$. Referring to FIG. 3 for this embodiment, the ratio $R_f/R_{in}$ is selected to be equal to the ratio $R_{Sun\ gear}/R_{Ring\ gear}$. As a result, the output signal $V_o=(1+R_f/R_{in})*V_i$.

It is contemplated that a plurality of operational amplifiers may be arranged in parallel and each with the gain $R_f/R_{in}$ (e.g., fixed carrier of planets) or the gain $(1+R_{Ring\ gear}/R_{Sun\ gear})$ (e.g., fixed ring gear), or the gain $(1+R_{Ring\ gear}/R_{Sun\ gear})$ (e.g., fixed sun gear), in order to provide the requisite power to drive the loads (e.g., the motor 14, the battery 60, et cetera).

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments. For example, a plurality of operational amplifiers may be arranged in parallel combining the embodiments of FIG. 2 and FIG. 3 for an epicyclic gear train 12', wherein no gear or carrier of planets is fixed.

Although embodiments discussed herein have been discussed in the context of an operational amplifier, it is of course contemplated that the operational amplifier may be provided by various discrete components (e.g., transistors and resistors), may be provided on a semiconductor material, or may be part of an application specific integrated circuit (ASIC).

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A hybrid gas turbine engine, comprising:
   a turbine;
   a compressor;
   a gear system that is driven by the turbine where the gear system includes a sun gear, a ring gear and a plurality of planet gears, where the ring gear has a ring gear radius of $R_{Ring\ gear}$ and the sun gear has a sun gear radius of $R_{Sun\ gear}$ such that the gear system provides a reduction ratio of $R_{Ring\ gear}/R_{Sun\ gear}$;
   a fan driven by the ring gear;
   a generator that is driven by the ring gear and provides a generator output signal;
   a power circuit that receives the generator output signal and provides an electrical gain $R_{Ring\ gear}/R_{Sun\ gear}$ to the generator output signal and provides a gain signal indicative thereof; and
   an electrical load that receives the gain signal.

2. The hybrid gas turbine engine of claim 1, where the electrical load comprises a motor that drives the compressor.

3. The hybrid gas turbine engine of claim 2, where the electrical load further comprises a battery located electrically parallel to the motor.

4. The hybrid gas turbine engine of claim 3, where the power circuit comprises at least one operational amplifier that receives the generator output signal and applies the electrical gain $R_{Ring\ gear}/R_{Sun\ gear}$ to generate the gain signal.

5. The hybrid gas turbine engine of claim 3, where the power circuit comprises a plurality of operational amplifiers that receive the generator output signal and each operational amplifier among the plurality of operational amplifiers applies the electrical gain $R_{Ring\ gear}/R_{Sun\ gear}$ to generate the gain signal.

6. A hybrid gas turbine engine, comprising:
   a turbine;
   a compressor;
   a gear system that is driven by the turbine where the gear system includes a sun gear, a plurality of planet gears configured to rotate and spaced apart by a planet carrier configured to rotate in a direction common to the sun gear, and a non-rotating ring gear, where the non-rotating ring gear has a ring gear radius of $R_{Ring\ gear}$ and the sun gear has a sun gear radius of $R_{Sun\ gear}$ such that the gear system provides a reduction ratio of $(1+R_{Ring\ gear}/R_{Sun\ gear})$;
   a fan driven by the planet carrier;
   a generator that is driven by the planet carrier and provides a generator output signal;
   a power circuit that receives the generator output signal and provides an electrical gain $(1+R_{Ring\ gear}/R_{Sun\ gear})$ to the generator output signal and provides a gain signal indicative thereof; and
   an electrical load that receives the gain signal.

7. The hybrid gas turbine engine of claim 6, where the electrical load comprises a motor that drives the compressor.

8. The hybrid gas turbine engine of claim 7, where the electrical load further comprises a battery located electrically parallel to the motor.

9. The hybrid gas turbine engine of claim 8, where the power circuit comprises at least one operational amplifier that receives the generator output signal and applies the electrical gain $(1+R_{Ring\ gear}/R_{Sun\ gear})$ to generate the gain signal.

10. The hybrid gas turbine engine of claim 8, where the power circuit comprises a plurality of operational amplifiers that receive the generator output signal and each operational amplifier among the plurality of operational amplifiers the electrical gain $(1+R_{Ring\ gear}/R_{Sun\ gear})$ to generate the gain signal.

11. A hybrid gas turbine engine, comprising:
    a turbine;
    a compressor;
    a gear system that is driven by the turbine where the gear system includes a non-rotating sun gear, a ring gear, and a plurality of planet gears configured to rotate and spaced apart by a planet carrier configured to rotate in a direction common to the ring gear, where the ring gear has a ring gear radius of $R_{Ring\ gear}$ and the non-rotating sun gear has a sun gear radius of $R_{Sun\ gear}$ such that the gear system provides a reduction ratio of $(1+R_{Sun\ gear}/R_{Ring\ gear})$;
    a fan driven by the planet carrier;
    a generator that is driven by the planet carrier and provides a generator output signal;
    a power circuit that receives the generator output signal and provides an electrical gain $(1+R_{Sun\ gear}/R_{Ring\ gear})$ to the generator output signal and provides a gain signal indicative thereof; and
    an electrical load that receives the gain signal.

12. The hybrid gas turbine engine of claim 11, where the electrical load comprises a motor that drives the compressor.

13. The hybrid gas turbine engine of claim 12, where the electrical load further comprises a battery located electrically parallel to the motor.

14. The hybrid gas turbine engine of claim 13, where the power circuit comprises at least one operational amplifier that receives the generator output signal and applies the electrical gain ($1+R_{Sun\ gear}/R_{Ring\ gear}$) to generate the gain signal.

15. The hybrid gas turbine engine of claim 13, where the power circuit comprises a plurality of operational amplifiers that receive the generator output signal and each operational amplifier among the plurality of operational amplifiers applies the electrical gain ($1\ R_{Sun\ gear}/R_{Ring\ gear}$) to generate the gain signal.

* * * * *

UNITED STATES PATENT AND TRADEMARK OFFICE
CERTIFICATE OF CORRECTION

PATENT NO. : 10,801,443 B2
APPLICATION NO. : 16/152488
DATED : October 13, 2020
INVENTOR(S) : Daniel B. Kupratis et al.

It is certified that error appears in the above-identified patent and that said Letters Patent is hereby corrected as shown below:

In the Claims

Column 6, Line 45, after "amplifiers", please insert --applies--

Signed and Sealed this
Tenth Day of November, 2020

Andrei Iancu
*Director of the United States Patent and Trademark Office*